(12) United States Patent
Lert, Jr. et al.

(10) Patent No.: US 11,778,956 B2
(45) Date of Patent: Oct. 10, 2023

(54) AUTOMATED VERTICAL FARMING SYSTEM USING MOBILE ROBOTS

(71) Applicant: Walmart Apollo, LLC, Bentonville, AR (US)

(72) Inventors: John G. Lert, Jr., Wakefield, MA (US); William J. Fosnight, Saratoga Springs, NY (US); Jeffrey C. Laba, Williston, VT (US)

(73) Assignee: Walmart Apollo, LLC, Bentonville, AR (US)

( * ) Notice: Subject to any disclaimer, the term of this patent is extended or adjusted under 35 U.S.C. 154(b) by 1156 days.

(21) Appl. No.: 15/947,551

(22) Filed: Apr. 6, 2018

(65) Prior Publication Data
US 2019/0307077 A1   Oct. 10, 2019

(51) Int. Cl.
| | |
|---|---|
| *A01G 9/14* | (2006.01) |
| *A01G 9/02* | (2018.01) |
| *A01G 9/26* | (2006.01) |
| *A01G 31/06* | (2006.01) |

(52) U.S. Cl.
CPC .......... *A01G 9/143* (2013.01); *A01G 9/022* (2013.01); *A01G 9/26* (2013.01); *A01G 31/06* (2013.01)

(58) Field of Classification Search
CPC .......... A01G 9/088; A01G 9/143; A01G 9/26; A01G 9/022; A01G 31/06; B65G 1/0492; B65G 1/0485
See application file for complete search history.

(56) References Cited

U.S. PATENT DOCUMENTS

| | | | | |
|---|---|---|---|---|
| 5,927,926 A  * | 7/1999  | Yagi   | B65G 1/0407 |
| | | | 414/280 |
| 8,694,152 B2 * | 4/2014  | Cyrulik | B65G 1/06 |
| | | | 700/214 |
| 9,330,373 B2 * | 5/2016  | Mountz | G06Q 10/087 |
| 9,505,556 B2 * | 11/2016 | Razumov | B65G 1/1378 |

(Continued)

FOREIGN PATENT DOCUMENTS

| | | |
|---|---|---|
| EP | 2712499 A1 | 4/2014 |
| EP | 3127420 A1 | 2/2017 |

(Continued)

OTHER PUBLICATIONS

English language Abstract for EP3127420 published Feb. 8, 2017.
(Continued)

*Primary Examiner* — Magdalena Topolski
(74) *Attorney, Agent, or Firm* — Fitch, Even, Tabin & Flannery LLP

(57) ABSTRACT

A vertical farming system includes a storage structure having racks of storage shelves for housing plant-carrying containers. Mobile robots travel around the racks to transfer containers of plants to and from the storage shelves. Under direction of a central control system, one or more mobile robots may transport a container from a storage location to a workstation. Once there, care may be provided for the plant, including water and/or other nutrients, and data may be gathered on the plant. This may be done by an owner of the plant, or by an automated service robot positioned at the workstation. Data gathered on the plant, including for example photographs, may be sent by email or other communications schemes to an owner of the plant.

29 Claims, 6 Drawing Sheets

(56) References Cited

U.S. PATENT DOCUMENTS

| | | | |
|---|---|---|---|
| 9,555,967 B2* | 1/2017 | Stevens | B65G 1/04 |
| 9,577,765 B2* | 2/2017 | Koide | H04B 10/80 |
| 9,630,777 B2* | 4/2017 | Yamashita | B65G 1/0485 |
| 9,682,821 B2* | 6/2017 | Sakamoto | H01L 21/681 |
| 9,718,617 B2* | 8/2017 | Koide | B65G 1/0435 |
| 9,884,720 B2* | 2/2018 | Van Den Berk | B65G 1/0492 |
| 10,023,434 B2* | 7/2018 | Brady | B66F 7/24 |
| 10,399,772 B1* | 9/2019 | Brazeau | B65G 1/0492 |
| 10,407,243 B1* | 9/2019 | Prout | B65G 1/1373 |
| 10,660,282 B1* | 5/2020 | Parrish | A01G 9/022 |
| 10,730,696 B2* | 8/2020 | Moulin | B65G 1/1378 |
| 10,766,699 B2* | 9/2020 | Warhurst | B65G 1/065 |
| 11,136,192 B2* | 10/2021 | Ahmann | B65G 1/1376 |
| 11,235,930 B2* | 2/2022 | Bastian, II | B25J 15/0057 |
| 2017/0027110 A1 | 2/2017 | Ito et al. | |
| 2017/0174431 A1* | 6/2017 | Borders | B65G 1/0421 |
| 2018/0035625 A1 | 2/2018 | Lindbo et al. | |
| 2018/0203458 A1* | 7/2018 | Zhang | G05D 1/0255 |
| 2019/0092567 A1* | 3/2019 | Lawrence | A01G 9/143 |
| 2019/0150375 A1* | 5/2019 | Miyahara | A01G 9/143 |
| 2020/0037522 A1 | 2/2020 | DeJarnette et al. | |
| 2020/0277137 A1* | 9/2020 | Bastian, II | B66F 7/065 |

FOREIGN PATENT DOCUMENTS

| | | | | |
|---|---|---|---|---|
| EP | 3476211 A2 * | 5/2019 | | A01G 9/023 |
| GB | 2592105 | 8/2021 | | |
| JP | 2015195786 | 11/2015 | | |
| WO | WO-2013065534 A1 * | 5/2013 | | G02B 6/003 |
| WO | 2013147603 | 10/2013 | | |
| WO | WO-2015152206 A1 * | 10/2015 | | A01G 9/249 |
| WO | 2016166311 A1 | 10/2016 | | |
| WO | 2017028904 | 2/2017 | | |
| WO | WO-2017191819 A1 * | 11/2017 | | A01G 9/00 |
| WO | 2018050816 A1 | 3/2018 | | |

OTHER PUBLICATIONS

English language Abstract for EP2712499 published Apr. 2, 2014.
International Search Report and Written Opinion dated Jun. 18, 2019 in International Patent Application No. PCT/US2019/023998.
Response to Office Action filed Jul. 20, 2021 in European Patent Application No. 19716681.2.
Office Action dated Nov. 8, 2021 in Japanese Patent Application No. 2020-553569.
English language Abstract for JP2015195786 published Nov. 9, 2015.
Office Action dated Aug. 18, 2022 in European Patent Application No. 19716681.2.
English language Abstract for WO2017028904 published Feb. 23, 2017.
Office Action dated Sep. 14, 2022 in Japanese Patent Application No. 2020-553569.
Response to Office Action filed May 9, 2022, with English translation of claims as amended, in Japanese Patent Application No. 2020-553569.
Response to Office Action dated Feb. 20, 2023 in European Patent Application No. 19716681.2.
Response Office Action dated Mar. 14, 2023 in Japanese Patent Application No. 2020-553569.

* cited by examiner

US 11,778,956 B2

AUTOMATED VERTICAL FARMING SYSTEM USING MOBILE ROBOTS

BACKGROUND

Plant life is vital to meet the increasing global demand for food and to sustain our current global environment. Plant growth and agricultural farming has traditionally been land-based, taking up billions of acres of arable land worldwide. However, land-based plant growth and farming have risks, such as changing environmental conditions and drought. They also have downsides, such as soil depletion, huge labor demands and an inefficient supply chain where food degrades as harvested plants and crops travel from remote areas to the locations where they are consumed or otherwise needed.

In the last century, vertical farming has evolved as a viable technique in urban areas for growing a wide variety of plants in an indoor, controlled environment. Vertical farms employ a vertical array of storage locations where different plants may be stored in containers. It is also known to provide a support system of water, light and nutrients which may be built into or alongside the vertical array, or into the containers themselves. Current vertical farming systems have certain drawbacks, including for example inefficient systems for transporting plant-carrying containers to and from the storage locations. Most systems use fixed cranes or elevator devices for accessing containers at storage locations. One known system employs three-dimensional cube structure which stores containers of plants directly on top of each other. Robotic load handlers travel in the horizontal plane of the upper surface of the cube structure. This system has the disadvantage of requiring lighting to be located within the containers.

SUMMARY

The present technology relates to a vertical farming system comprising a storage structure having racks of storage shelves for housing plant-carrying containers. Pairs of racks may be arranged to face each other to define a number of aisles between the pairs of racks. Mobile robots travel within the aisles to retrieve and store containers of plants. The mobile robots are capable of moving in vertical planes within the aisles, as well as in horizontal planes on one or more transit decks connecting the different aisles. This permits a mobile robot to access every storage location within the vertical farming system.

Under direction of a control system, one or more mobile robots may transport a container from a storage location to a workstation. Once there, care may be provided for the plant, including water and/or other nutrients, and data may be gathered on the plant. This may be done by an owner of the plant, or by an automated service robot working per a predefined schedule.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology, roughly described, relates to a vertical farming system comprising a storage structure having racks of storage shelves for housing plant-carrying containers. Mobile robots travel around the racks to transfer containers of plants to and from the storage shelves. Under direction of a Central Control System (CCS), one or more mobile robots may transport a container from a storage location to a workstation. Once there, care may be provided for the plant, including water and/or other nutrients, and data may be gathered on the plant and/or soil. This may be done by a human operator, or by an automated service robot positioned at the workstation. Data gathered on the plant, including for example photographs, may be sent by email or other communications schemes to an owner of the plant or other interested person.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and for illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25% of a given dimension.

Figure 1:
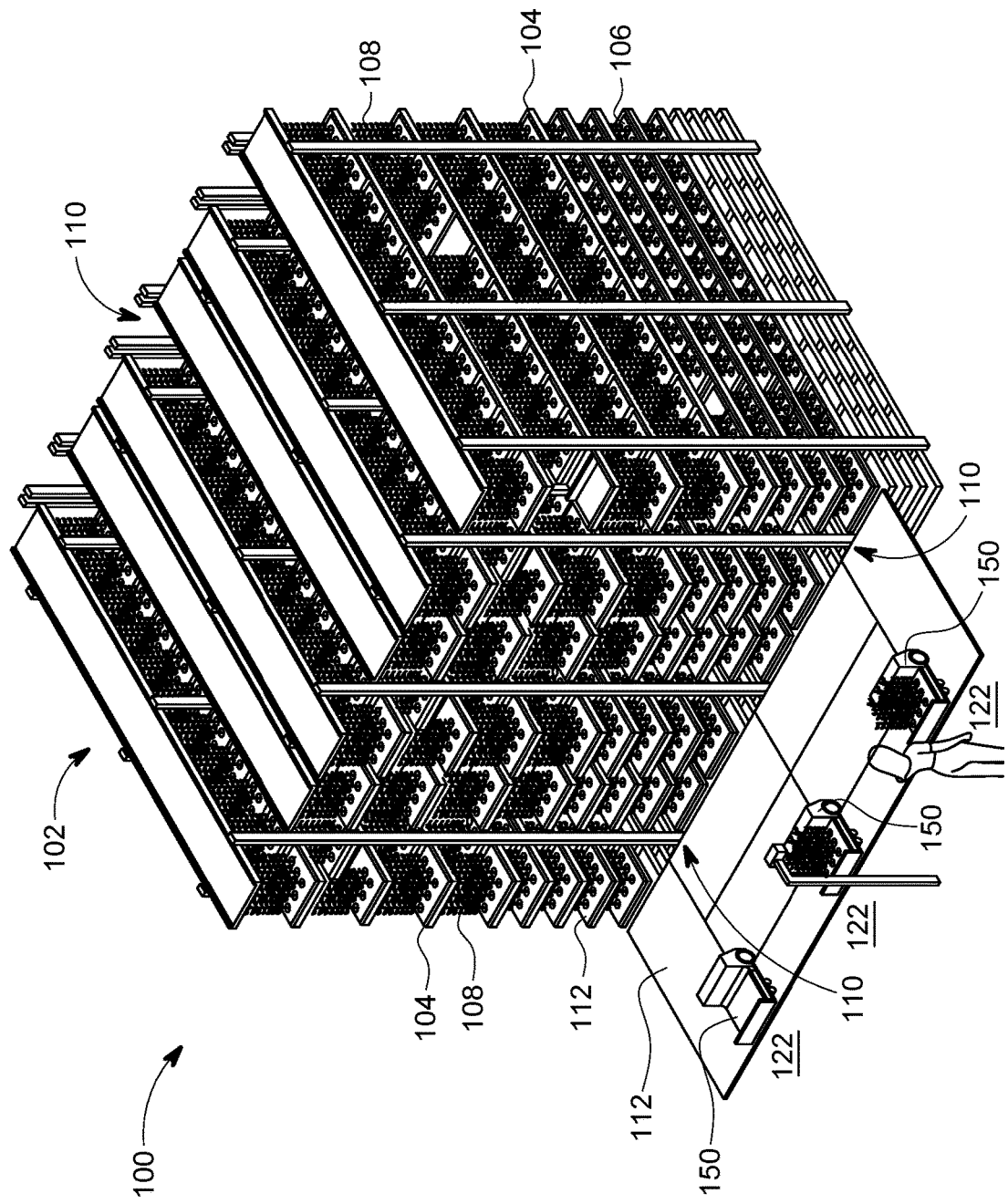
FIG. 1 is a partial perspective view of a vertical farming system according to embodiments of the present technology.

FIG. 1 shows a partial perspective view of an embodiment of vertical farming system 100 including a storage structure 102 for storing containers carrying plants. It is understood that any of a wide variety of plants may be stored within the vertical farming system of the present technology. As used herein, the terms "plant" and "plants" are to be broadly construed and may in general refer to any living organism which absorbs water through a system of roots, and/or which synthesizes nutrients by photosynthesis. Such plants include but are not limited to agricultural crops, produce, grass, cane, shrubs, trees of a certain size, flowers, herbs, ferns and mosses. As explained below, other types of living organisms may be stored in the storage structure 102 in further embodiments.

The plants may be stored in containers, which again is to be broadly construed to include a wide variety of support structures, including but not limited to totes, crates, pallets and trays. The plants may sit in pots or planters within the containers. Alternatively, the plants may sit directly within the containers (no pots or planters), within soil and/or within a hydroponic solution.

The storage structure 102 of FIG. 1 may include a number of racks 104 of storage locations 106 for storing plants 108. In particular, each rack 104 includes a vertical (y-z) array of storage locations 106 and level changing towers at positions along the racks which in embodiments may be vertical towers. Mobile robots 150 may travel between storage levels in the z-direction within the level changing towers. Pairs of racks 104 may be arranged to face each other, separated by aisles 110. An aisle 110 may have a width such that a mobile robot 150 traveling within an aisle 110 may transfer plant-carrying containers to the racks 104 on either side of the aisle 110. The vertical farming system 100 may further include one or more decks 112. Where multiple decks are provided, the decks 112 may be spaced apart at different horizontal levels of the storage structure 102. The decks 112 may extend between the aisles so that robots can maneuver in the x-y plane of each deck to travel between different aisles.

Figure 2:
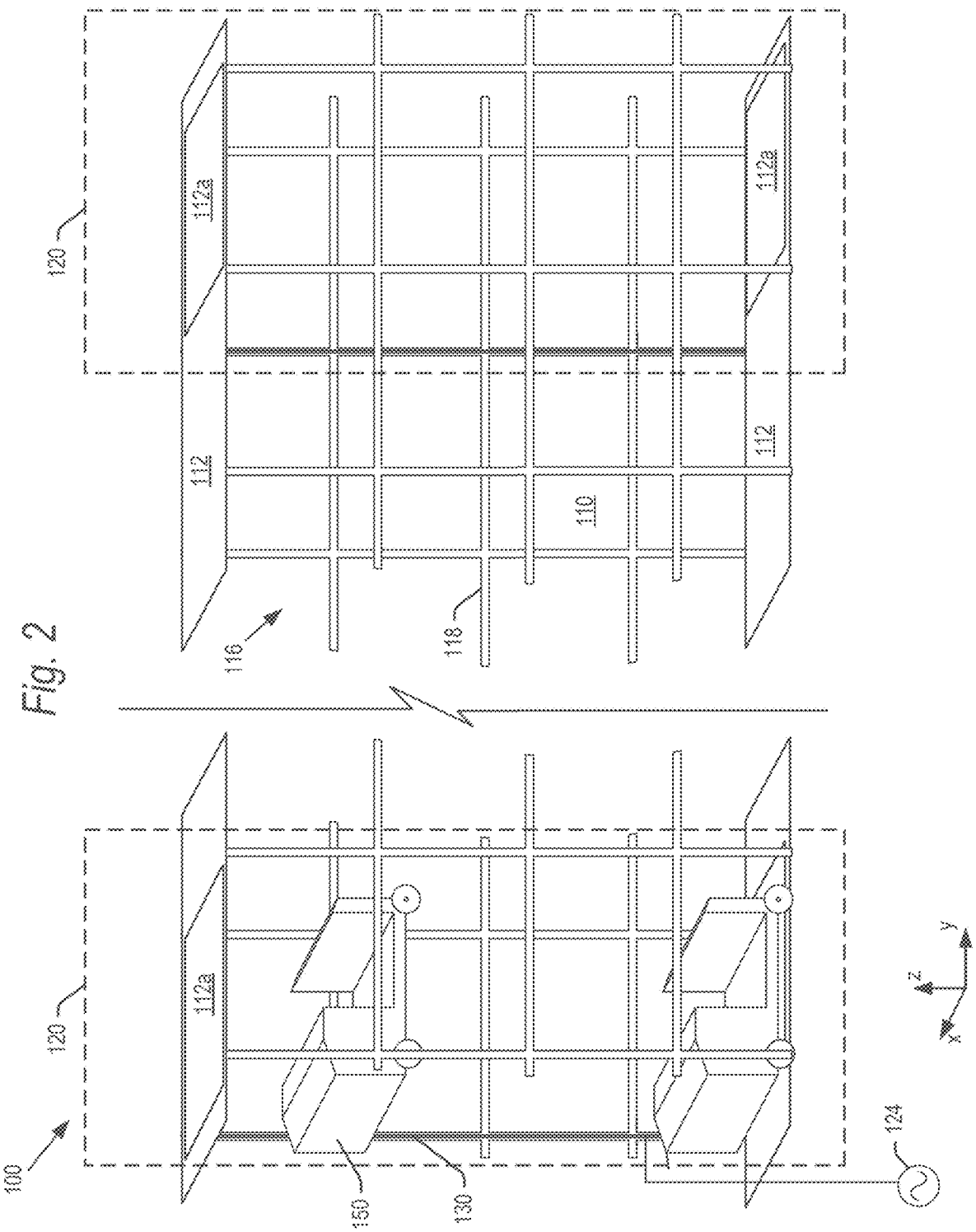
FIG. 2 is a side perspective view of a portion of a track system of the vertical farming system according to embodiments of the present technology.

FIG. 2 illustrates a perspective view of a section of a track system 116 within an aisle 110. The track system 116 comprises horizontal rails 118 and level changing towers 120 (enclosed within dashed lines). The number of horizontal rails 118 and level changing towers 120 shown in FIG. 2 is by way of example only and there may be greater or fewer horizontal rails 118 and/or level changing towers 120 in further embodiments. For example, the track system could be comprised of contiguous level changing towers positioned along a single level horizontal rail or on a horizontal floor. However, in one embodiment, there is one set of horizontal rails 118 for each horizontal level of storage locations 106 within racks 104. The storage locations 106 (not shown in FIG. 2) would be positioned adjacent the track system 116, on opposed sides of the aisle 110.

The vertical farming system 100 may operate with one or more mobile robots 150 for transferring containers between workstations 122 (FIG. 1) and storage locations 106 in the racks 104. Mobile robots 150 in general may be self-guided so as to move horizontally and vertically along track system 116 within aisles 110 to transfer containers between the mobile robots 150 and storage locations 106. The mobile robots 150 may travel vertically in the z-direction within level changing towers 120 between levels of storage locations 106. Once at a target horizontal level, the mobile robots may move horizontally along rails 118 to a selected storage location 106 to retrieve inventory from or deliver inventory to that storage location. The mobile robots 150 may include on board power supplies which may be recharged by contact with powered rails of the track system 116. The powered rails may be connected to a power source 124.

The decks 112 allow travel of mobile robots 150 between and into the aisles 110 at different levels of the storage structure 102. The decks 112 may be provided with openings 112a in the deck flooring at the level changing towers. The openings 112a allow mobile robots moving vertically between levels in the level changing tower 120 to pass through one or more decks 112 within the aisle.

Further details of a storage structure, track system and mobile robot which may be used in conjunction with the present technology are described for example in the following U.S. patents and patent applications: U.S. Pat. No. 9,139,363, to John Lert, entitled "Automated System For Transporting Payloads," issued Sep. 22, 2015; U.S. Patent Application Publication No. 2016/0355337, to John Lert and William Fosnight, entitled, "Storage and Retrieval System," filed on Jun. 2, 2016; and U.S. Patent Application Publication No. 2017/0313514, to John Lert and William Fosnight, entitled, "Order Fulfillment System," filed on May 10, 2017. Each of these patents and applications are incorporated by reference herein in their entirety.

The system of the present technology using one or more mobile robots 150 offers a significant advantage over conventional systems using a crane, elevator or other fixed conveyor system. In particular, such conventional systems need to provide a sufficiently large conveyor system, in proportion to the size of the storage, so as to provide access to every storage location in the vertical farm. For example, if a conventional system has multiple racks, a crane, elevator or other conveyor is required for each rack. Thus, there are significant costs associated with large vertical farms. It is also difficult to scale (enlarge) conventional vertical farms, as more storage locations require a proportionately larger conveyor system.

By contrast, the use of free-moving mobile robots 150 divorces the size of the storage structure from size of the conveyor system. In particular, each of the one or more mobile robots 150 are able to travel throughout the entire storage structure 102, regardless of the size of the storage structure 102. As such, vertical farming system 100 can operate using only a single mobile robot, even where additional racks or storage locations are added. The number of mobile robots 150 in the system may be dictated by the frequency with which plants are to be brought to the one or more workstations 122. The number of robots 150 is not dictated by the size of the storage structure. This provides a simpler, more cost effective system which may be easily scaled (up or down) as desired.

Figure 3:
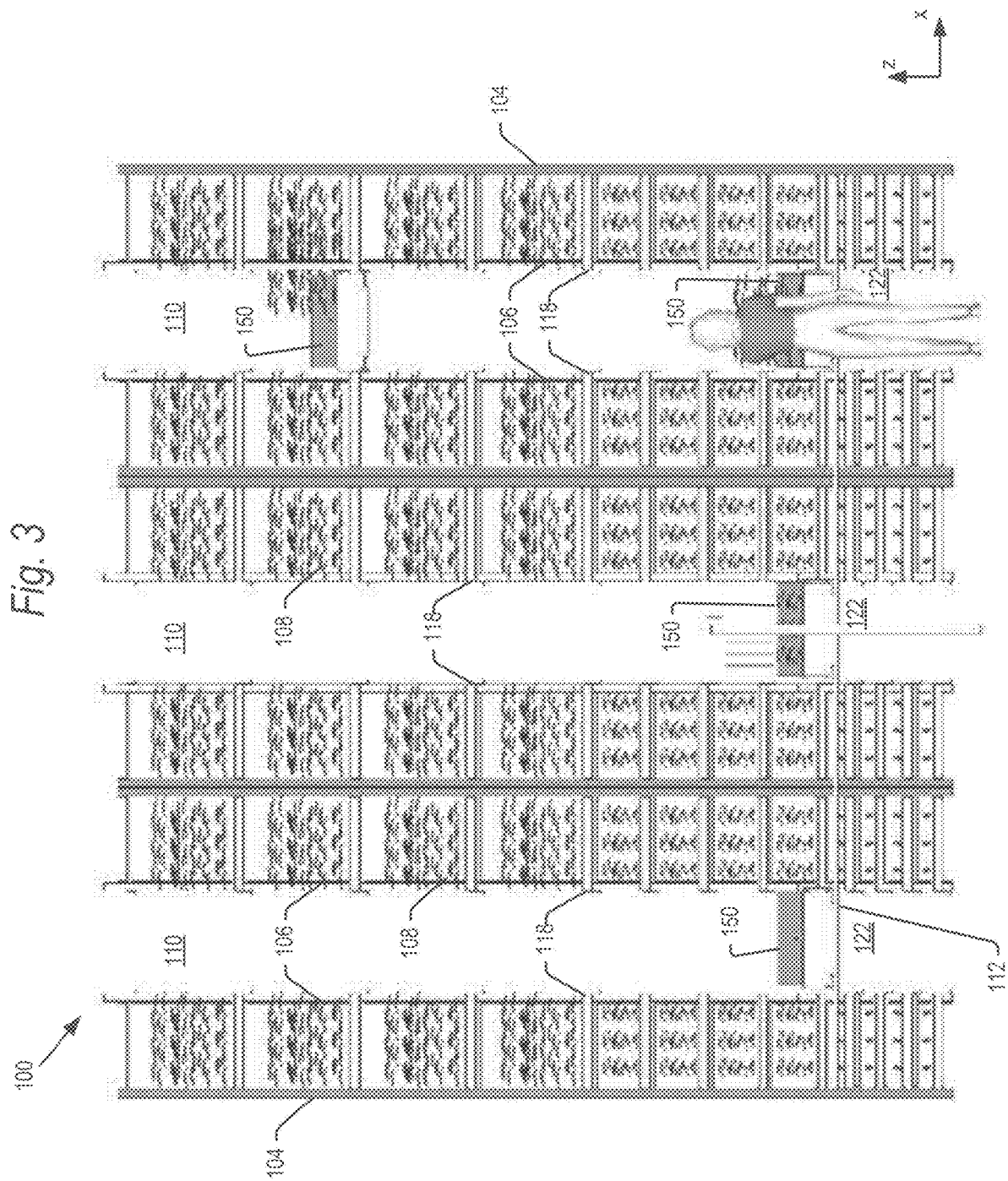
FIG. 3 is a front view of a vertical farming system according to embodiments of the present technology.

FIG. 3 shows a view of the vertical farming system 100 from the front, down the storage aisles 110. As shown, a vertical spacing between the different levels of horizontal rails 118 the mobile robots 150 travel on, and the shelves of the storage locations 106, can be provided to accommodate the heights of the plants as they grow. Young seedlings may be stored on small vertically spaced shelves (shown in the bottom area in FIG. 3), and maturing plants are stored on shelves with larger vertical spacings.

Figure 4:
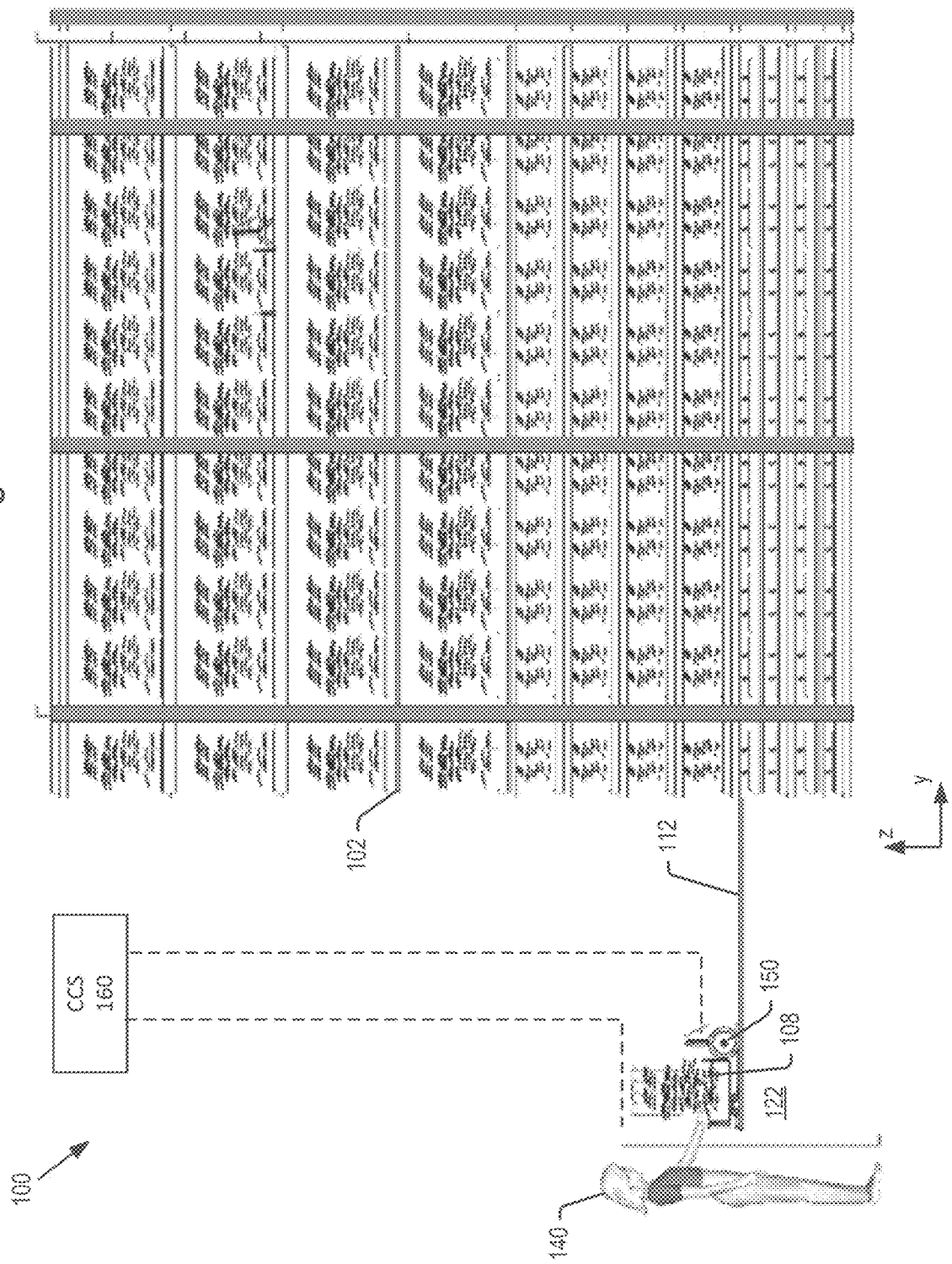
FIG. 4 is a side view of a vertical farming system according to embodiments of the present technology.

FIG. 4 shows a view of the vertical farming system 100 from the side. FIG. 4 shows the transit deck 112 that mobile robots 150 use to access all storage aisles 110 as well workstations 122. In the embodiments shown, the workstations 122 are no more than positions on the deck 112 where robots 150 carrying plant containers may present the plants 108 to a human operator 140 or, alternatively, to an automated service robot. The control system may designate a given workstation 122 for a human operator and then guide the human operator to that workstation 122. Before or after this, the control system may also provide instructions guiding the mobile robot 150 to that workstation 122 with a plant to be serviced by the human operator. In embodiments there may be defined workstation positions, or the positions of workstations 122 may vary on deck 112.

The transit deck 112 may be positioned to allow the containers to be presented at an ergonomic height for the human operator 140, or a convenient height for an automated service robot. As explained below in greater detail, workstations 122 may optionally include devices and supplies for servicing plants 108 and gathering data on plants 108. Such devices and supplies may allow a human 140 and/or automated service robot to water, trim, harvest and/or gather data on plants 108, as well as plant seeds for new plants 108. As noted, instead of a human operator 140, an automated service robot may service plants 108. An example of such an automated service robot is a gantry or 6-axis robot capable of planting seeds, trimming, watering, gathering data and/or harvesting plants 108.

Embodiments described above include a deck 112 including workstations 122. However, in an alternative embodiment, one or more workstations may be incorporated directly into the storage structure 102. That is, one or more of the storage locations 106 may be converted into a workstation 122, or "storage structure workstation." In such embodiments, mobile robots may travel within the storage structure 102 vertically or horizontally to the storage structure workstation. The storage structure workstation may be equipped with any of the devices and features described herein for caring, inspecting and gathering data on the plants at the storage structure workstation as any of the other embodiments of the workstations 122 described herein. The storage structure workstation may be attended by a human operator 140, or automated service robot, as described above. Where attended by a human operator, safety features may be built into the storage structure workstation to prevent contact between a human operator and a moving mobile robot. An example of this type of "storage structure workstation" is disclosed in U.S. Patent Application Publication No. 2016/0355337 (FIGS. 15-18), previously incorporated by reference.

Figure 5:
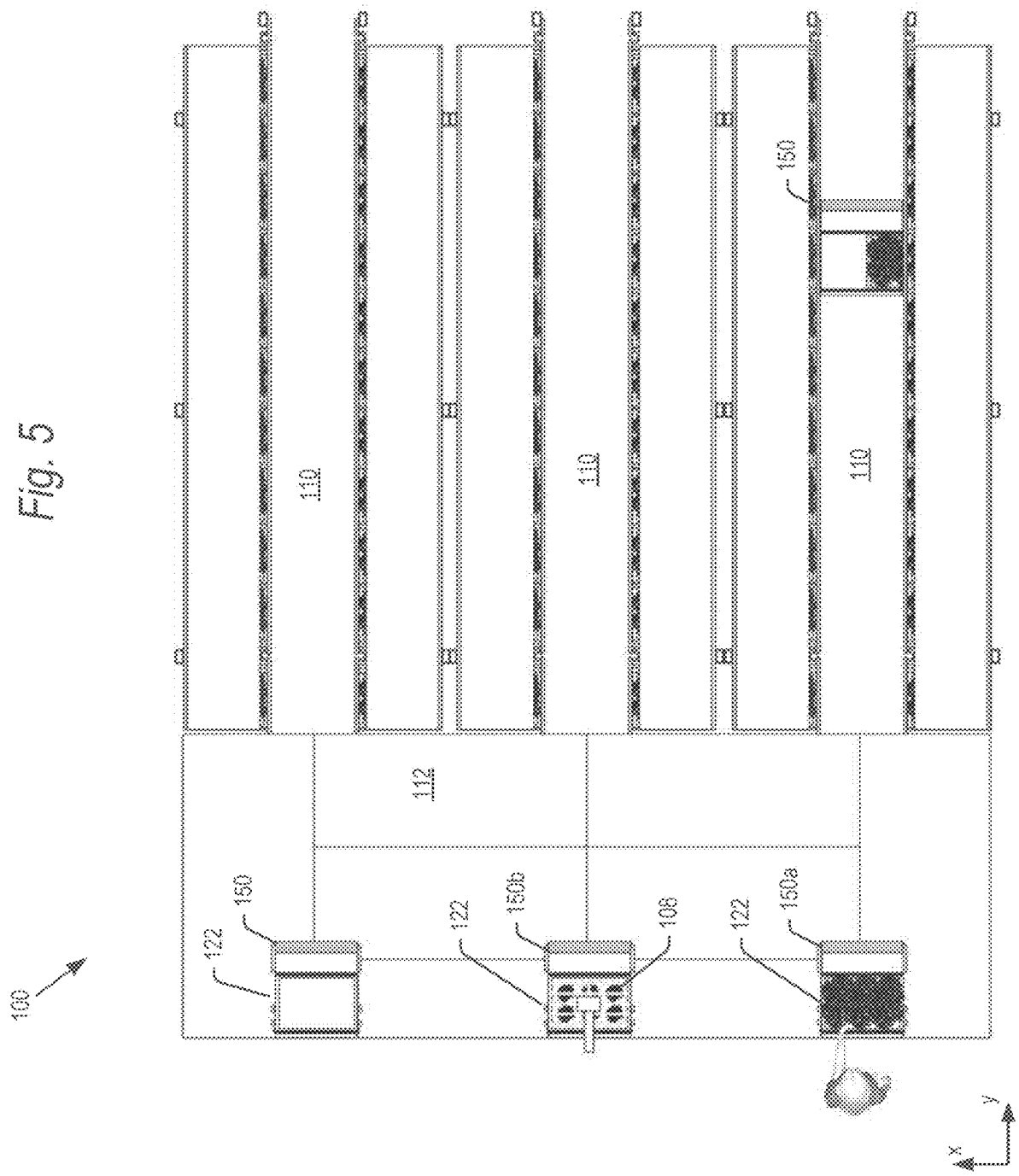
FIG. 5 is a top view of a vertical farming system according to embodiments of the present technology.

FIG. 5 is a top view of the vertical farming system 100. The mobile robots 150 are able to retrieve the plant containers from the storage structure 102 and deliver them to various workstations 122 configured to perform a wide variety of services on the plants 108. In embodiments, each workstation 122 is able to provide all plant services. In further embodiments, different workstations 122 may specialize in different plant services. In FIG. 5, the mobile robot 150a is for example presenting a container to a workstation 122 with soil for planting seeds. The mobile robot 150b is for example presenting a container to an automated inspection, watering and nutrient workstation 122. This (or other) workstation 122 may also include data-gathering devices, such as a camera, spectrometer and/or other devices to measure the size, height, and healthiness attributes of the growing plants. Based on this feedback, the amount of water and nutrients to be deliver to the plant can be automatically controlled. In the case where the plants are distressed or in blight, a warning message may be sent for human intervention.

As noted, one or more workstations may include a camera and other devices for collecting data regarding the health and appearance of a plant 108. Data and images may be presented remotely to humans that are interested in monitoring the growth of the plants. For example, children could automatically receive a daily e-mail showing the progress of their tomato plant growth for educational purposes. Alternatively, others could harvest (or direct the vertical farm to harvest) their plant or fruit based on the images they received.

In one example, a customer at a store (such as for example an automated fulfillment center) can purchase a plant and have it stored in storage structure 102 of the vertical farming system 100 (which may for example be at the automated fulfillment center). The customer could alternatively purchase the plant remotely, for example by accessing a website from their home, and have it stored in n storage structure 102 of the vertical farming system 100 (which again may for example be at the automated fulfillment center). Thereafter, the customer can receive images and other data regarding their plant, and decide when to come to the store to harvest from their plant. It may also happen that a customer wishes to take their plant home from the vertical farming system 100. In this case, the customer may indicate this desire, for example via an in-store kiosk or terminal. The customer's plant may then be delivered to the customer via an automated fulfillment system, possibly along with other fungible and/or non-fungible goods ordered by the customer.

Examples of the above-described order fulfilment systems, and in-store or remote purchasing of fungible and non-fungible goods such as plants are described in the above-identified patents/applications which have previously been incorporated by reference, as well as in U.S. patent application Ser. No. 15/816,832, to John Lert, Jr., entitled, "Automated-Service Retail System And Method," filed Nov. 17, 2017, and U.S. patent application Ser. No. 15/884,677, to John Lert, Jr. and William J. Fosnight, entitled, "Automated Proxy Picker System For Non-Fungible Goods," filed Jan. 31, 2018, which applications are also incorporated by reference in their entirety herein.

Figure 6:
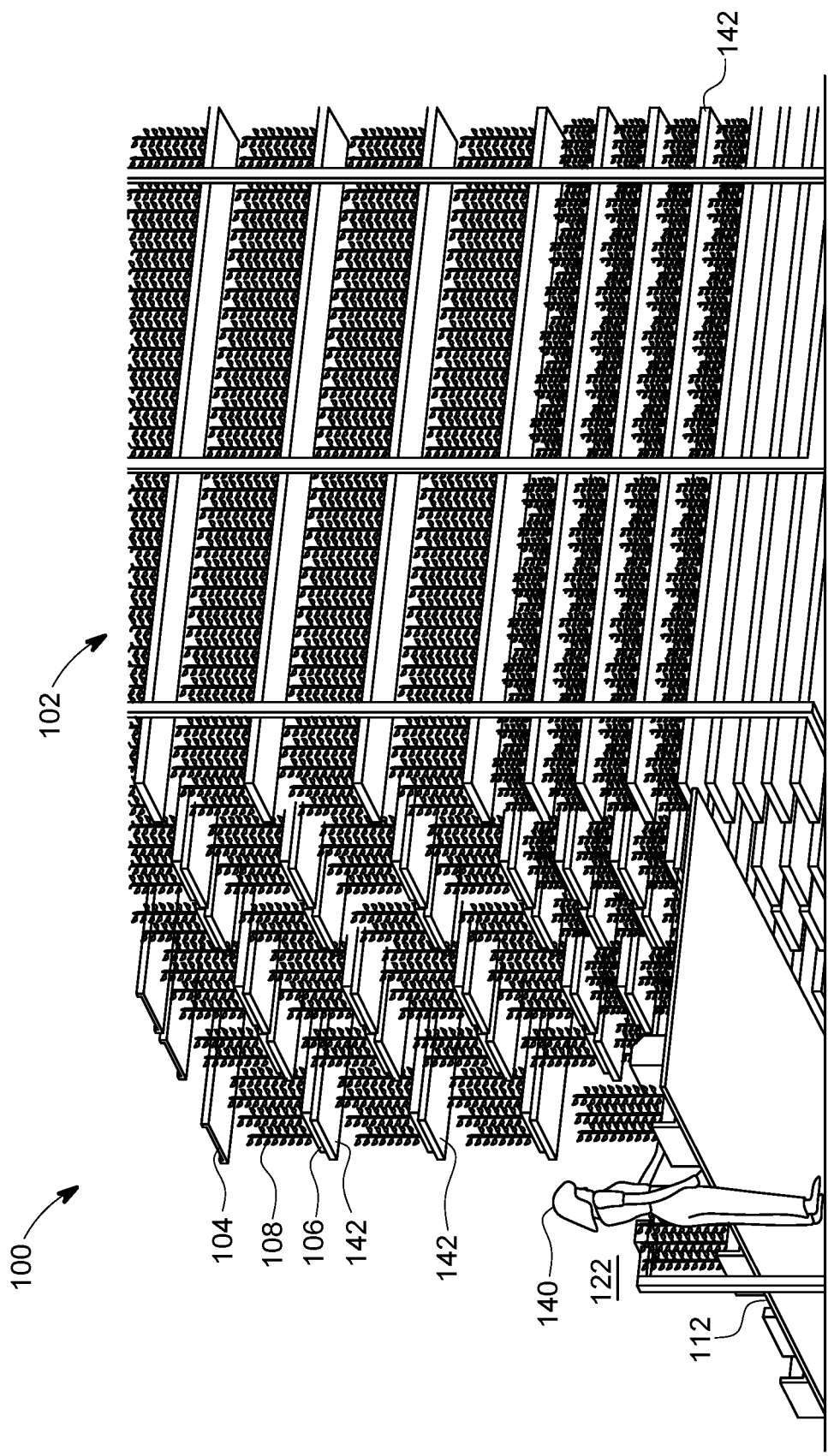
FIG. 6 is a partial bottom perspective view of a vertical farming system according to embodiments of the present technology.

FIG. 6 is a bottom perspective view of the vertical farming system 100. As seen in FIG. 6, the undersides (bottom surface) of storage locations 106 may include LED lights 142 (or other grow lights) over the container positions therebelow to enable plant growth. The system of the present technology provides several advantages. First, there is no need to incorporate plumbing or other plant-servicing features into the storage racks or plant containers. The grow lights 142 provide the one energy source that the plants need in the racks 104 on a continuous or regular basis. All other care required by the plants 108 may be administered at the workstation 122. Thus, the storage rack and containers may be greatly simplified, and more cost effective, than conventional vertical farming systems which provide water and other nutrients to the storage locations and/or plant containers.

Additionally, conventional system which provide water and other nutrients to plants while in storage do so without actual knowledge of whether or how much water is required, and without actual knowledge what nutrients, if any, are needed and how much to provide. Conventional systems such as described above operate based only on predefined watering and nutrient schedule. The present technology provides a significant advantage over such conventional systems in that watering, nutrients and other care is administered only after inspection and/or data gathering for a plant at a workstation. As noted above, the mobile robot(s) 150 bring the containers down to the workstations 122 daily, or any prescribed frequency for inspection, data-gathering, etc. Once inspected, the plant may be provided with the exact amount of water and/or nutrients needed, and any particular care required, given the measured health of the plant. Conventional system which provide watering or the like to plants while in storage based only on a schedule do not know the actual health of the plant and cannot tailor the watering and/or care as in the present technology.

As noted, the vertical farming system 100 may further employ a Central Control System (CCS), shown schematically at 160 in FIG. 4. Each plant and/or container may be assigned a unique identifier which is stored in the CCS 160 so that the CCS 160 knows the positions of each plant 108 in storage structure 102. The CCS 160 may monitor and provide navigation instructions to the one or more mobile robots 150 to retrieve selected plants and bring them to and from the workstation 122. The CCS 160 may for example direct retrieval of a plant 108 from a storage location 106 when a customer requests that his or her plant be brought to a workstation 122. Alternatively, the CCS 160 may direct periodic retrieval of a plant 108 from a storage location 106, for example once a day, so that it may be inspected and/or serviced, either by a human operator 140 or by an automatic service robot. RFID tags may be affixed to the containers that are capable of being read by the mobile robot. This ensures the plant is tracked correctly and permits the plant locations to be accurately tracked at all times.

As noted above, one or more of the workstations 122 may include data-gathering equipment. This data may be stored and analyzed by the CCS 160. Based on data gathered by the data-gathering equipment, the CCS 160 may further direct that certain care be provided to the plant, that the plant be harvested, that a notification be sent to an owner of the plant, and/or some other service be performed on or with regard to a plant. Once periodic inspection/servicing of a plant is complete, the CCS 160 may direct a mobile robot 150 to return the plant to the same or different storage location 106. The CCS 160 may communicate with the one or more mobile robots 150 and the workstation 122 via a wireless network.

As noted above, the CCS 160 may generate messages that are sent to children or other human operators. Additionally, such children or other human operators can send a message to the CCS 160 of vertical farming system 100 to make requests regarding their plant(s) 108. For example, in advance of a visit by a human operator, the operator can send a request to the CCS 160 that his or her plant(s) be brought down to a workstation 122. In response, the CCS 160 can direct a mobile robot 150 to retrieve the plant(s) and bring it or them to a workstation for the operator's visit. As a further example, where an operator is shopping at a store associated (e.g., adjacent to) the vertical farming system 100, the operator can send a message to the CCS 160 to bring his or her plant to a workstation so they can harvest produce from it as part of their shopping at the store. The workstation would then fulfill that request. The human operator can send a message to the CCS 160 making other requests, such as for example to increase the amount of light, or to increase or decrease the frequency with which a plant is brought to a workstation for inspection by an automated service robot.

As described above, plants 108 may be owned by individuals. Individuals or corporate entities may own one or more plants 108. Where multiple plants are owned, they may be maintained together in storage structure 102, or dispersed throughout the storage structure. In examples, a portion or all of the plants 108 in the vertical farming system 100 may be owned by a single individual or entity, such as where the plants are harvestable crops.

As noted above, the number of mobile robots 150 used in the system 100 may (but does not have to be) based on the frequency with which plants 108 need to brought to and serviced at a workstation 122. In one example, this frequency may be determined, for each plant 108 stored in storage structure 102, by the CCS 160. In particular, the CCS 160 may be provided with baseline data regarding typical service needs of each plant stored in the storage structure 102, including for example how often it needs water and how much, how much light it needs, optimal nutrients for the soil, etc. This baseline may then be customized and optimized for each plant based on the inspection and data gathering when each plant is periodically brought to a workstation 122. In particular, based on the measurements made at the workstation, the frequency that the containers are brought to the workstation can be optimized for each plant based on the measured attributes. In this way, the vertical farm is "self learning" as to the frequency that water or other servicing is needed for a particular plant. The frequency with which a particular plant is brought to a workstation 122 may be varied over time by the CCS 160, based on the health and other attributes of a plant. The amount of light provided by the grow lights 142 may also be controlled and varied by the CCS 160 in the same manner.

In embodiments described above, the storage locations store plants 106. However, in further embodiments, living organisms other than plants may be stored in storage locations 106. Such living organisms may comprise animals, such as for example those raised for food. In such embodiments, the containers may be in the form of cages. The cages may be retrieved when requested, or on a periodic schedule, for servicing, inspection, cleaning and/or data gathering by the mobile robots in accordance with any of the embodiments described above.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vertical farming system, comprising:
 a storage structure including storage locations for storing containers containing living organisms, the storage locations arranged in a plurality of racks separated from each other by a plurality of aisles;
 a workstation configured to provide at least one of care for the living organisms and data gathering on the living organisms;
 a mobile robot configured to move throughout the plurality of storage locations in the plurality of aisles, and configured to travel between the storage structure and the workstation;
 the mobile robot further configured to retrieve a selected container containing a living organism from the storage structure and bring the living organism to the workstation for at least one of care for the living organism and gathering data on the living organism; and
 a deck spaced from and above the floor level, the workstation positioned on the deck, the deck extending between the storage structure and the workstation, the mobile robot capable of moving freely around on the deck and capable of entering the plurality of aisles of the storage structure and workstation from the deck.

2. The vertical farming system of claim 1, wherein the mobile robot is configured to retrieve the selected container and bring it to the work station in response to a request from a human operator to provide at least one of care for the living organism and to inspect the living organism.

3. The vertical farming system of claim 1, wherein the mobile robot is configured to retrieve the selected container and bring it to the work station in response to an instruction issued in accordance with a periodic scheduled retrieval of the living organism and delivery to the workstation.

4. The vertical farming system of claim 1, wherein the storage locations are arranged on spaced apart shelves in the storage structure.

5. The vertical farming system of claim 4, wherein the spacing of spaced apart shelves varies at different shelf levels to accommodate living organisms of different heights.

6. The vertical farming system of claim 1, further comprising grow lights in the storage structure to provide light to the living organisms.

7. The vertical farming system of claim 1, further comprising an automated service robot at the workstation for providing care for the living organisms.

8. The vertical farming system of claim 1, wherein the living organism is a plant.

9. The vertical farming system of claim 8, wherein the mobile robot is further configured to return the plant from the workstation to a storage shelf in the storage structure.

10. The vertical farming system of claim 1, wherein the workstation is configured with storage locations for storage of the living organisms.

11. The vertical farming system of claim 1, wherein the mobile robot comprises a first mobile robot, the vertical farming system further comprising one or more second mobile robots operating within the storage structure simultaneously with the first mobile robot.

12. The vertical farming system of claim 1, wherein one or more of the living organisms in each of the containers are owned by each of a plurality of owners, the vertical farming system comprising:
one or more processors configured to:
capture images of the one or more living organisms owned by a customer and send the images to the customer;
receive a first request from a customer to transport the container containing the one or more living organisms owned by the customer to the workstation to enable the customer to inspect the one or more living organisms, provide care for the one or more living organisms and harvest the one or more living organisms;
fulfill the first request;
receive a second request from the customer to alter at least one of: the amount of light received by the one or more living organisms owned by the customer, and a frequency with which the one or more living organisms owned by the customer are brought to the workstation for inspection or care; and
fulfill the second request.

13. The vertical farming system of claim 12, wherein the at least one of the first and second requests are received remotely from a facility housing the vertical farming system.

14. A vertical farming system, comprising:
a storage structure including a plurality of storage locations for storing containers containing living organisms, the plurality of storage locations arranged in a plurality of racks, the plurality of racks separated by a plurality of aisles;
a plurality of workstations configured to provide at least one of care for the living organisms and data gathering on the living organisms;
a mobile robot configured to move in three dimensions, the mobile robot configured to:
move horizontally and vertically throughout the plurality of storage locations,
move horizontally between the plurality of racks in the plurality of aisles, and
move between the plurality of storage locations and the plurality of workstations;
a central control system configured to direct the mobile robot to retrieve a selected container containing a living organism from the storage structure and bring the living organism to a selected workstation of the plurality of workstations for at least one of care for the living organism and gathering data on the living organism; and
a deck spaced from and above the floor level, the workstation positioned on the deck, the deck extending between the storage structure and the workstation, the mobile robot capable of moving freely around on the deck and capable of entering the plurality of aisles of the storage structure and workstation from the deck.

15. The vertical farming system of claim 14, wherein the central control system is further configured to store data gathered on the living organism.

16. The vertical farming system of claim 15, wherein the central control system determines care to be provided to the living organism based on the data gathered on the living organism.

17. The vertical farming system of claim 14, wherein the central control system issues a command to the mobile robot to retrieve the container containing the living organism based on a request from a human operator to bring the living organism to one of the plurality of workstations.

18. The vertical farming system of claim 14, wherein the central control system issues a command to the mobile robot to retrieve the container containing the living organism based on a periodic schedule at which the living organism is brought to the selected workstation of the plurality of workstations.

19. The vertical farming system of claim 14, wherein the plurality of workstations provide different functions with respect to the care and data gathering for the living organism.

20. The vertical farming system of claim 14, wherein the central control system is further configured to generate an electronic message for sending to a human operator associated with the living organism.

21. The vertical farming system of claim 14, wherein the central control system controls a frequency with which the living organism is brought to one of the plurality of workstations based on at least one of a health and attributes of the living organism.

22. The vertical farming system of claim 14, wherein the living organism is a plant.

23. A vertical farming system, comprising:
a storage structure including storage locations for storing containers containing plants, the storage locations arranged in a plurality of racks, the plurality of racks separated by a plurality of aisles;
a plurality of workstations, spaced away from the storage structure, configured to provide at least one of care for the plants and data gathering on the plants, the plurality of workstations comprising a camera for capturing an image of the plant;
a mobile robot configured to:
move horizontally and vertically throughout the storage locations,
move horizontally between the plurality of racks in the plurality of aisles, and
move horizontally between the storage structure and each of the plurality of workstations; and a central control system comprising one or more processors configured to:
  capture images of the one or more living organisms owned by a customer and send the images to the customer;
  receive a first request from a customer to transport the container containing the one or more living organisms owned by the customer to the workstation to enable the customer to inspect the one or more living organisms, provide care for the one or more living organisms and harvest the one or more living organisms;
  fulfill the first request;
  receive a second request from the customer to alter at least one of: the amount of light received by the one or more living organisms owned by the customer, and a frequency with which the one or more living organisms owned by the customer are brought to the workstation for inspection or care; and
  fulfill the second request.

24. The vertical farming system of claim 23, wherein the human operator is an owner of the plant located remotely from the vertical faming system, the message comprising a request for the owner to visit the plant to care for the plant.

25. The vertical farming system of claim 23, wherein the human operator is an owner of the plant located remotely from the vertical faming system, the message further comprising a request for the owner to visit the plant to harvest the plant.

26. The vertical farming system of claim 11, wherein the first mobile robot and the one or more second mobile robots operate independently of each other while moving around simultaneously within the storage structure.

27. The vertical farming system of claim 11, wherein the first mobile robot and the one or more second mobile robots are configured to transport multiple containers with living organisms between the workstation and storage locations of the storage structure simultaneously.

28. The vertical farming system of claim 11, wherein one of the first mobile robot and one or more second mobile robots transports a container with a living organism from the storage structure to the workstation, remains at the workstation while the care for the living organisms are provided and the data gathering on the living organisms is performed, and transports the living organism from workstation back to the storage structure, all while other containers are being transported to, from or within the storage structure by others of the first mobile robot and one or more second mobile robots.

29. The vertical farming system of claim 11, wherein the vertical farming system is scaled larger by adding more storage locations and more mobile robots to the two or more mobile robots without modifying other aspects of the vertical farming system.

* * * * *

UNITED STATES PATENT AND TRADEMARK OFFICE
CERTIFICATE OF CORRECTION

PATENT NO. : 11,778,956 B2
APPLICATION NO. : 15/947551
DATED : October 10, 2023
INVENTOR(S) : John G. Lert, Jr. et al.

It is certified that error appears in the above-identified patent and that said Letters Patent is hereby corrected as shown below:

On the Title Page

Item (57), under "Abstract", in Column 2, Lines 11-12, delete "for example" and insert -- for example, --, therefor.

Item (57), under "Abstract", in Column 2, Lines 12-13, delete "other communications" and insert -- other communication --, therefor.

In the Claims

Column 11, Claim 24, Line 23, delete "faming system," and insert -- farming system, --, therefor.

Column 11, Claim 25, Line 27, delete "faming system," and insert -- farming system, --, therefor.

Signed and Sealed this
Twenty-sixth Day of December, 2023

Katherine Kelly Vidal
*Director of the United States Patent and Trademark Office*